(12) United States Patent
Li

(10) Patent No.: US 9,217,889 B2
(45) Date of Patent: Dec. 22, 2015

(54) NARROW BEZEL LIQUID CRYSTAL DISPLAY MODULE

(71) Applicant: Shenzhen China Star Optoelectronics Technology Co., Ltd., Shenzhen (CN)

(72) Inventor: Quan Li, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 13/812,523

(22) PCT Filed: Dec. 27, 2012

(86) PCT No.: PCT/CN2012/087734
§ 371 (c)(1),
(2) Date: Jan. 28, 2013

(87) PCT Pub. No.: WO2014/101063
PCT Pub. Date: Jul. 3, 2014

(65) Prior Publication Data
US 2015/0301391 A1 Oct. 22, 2015

(30) Foreign Application Priority Data

Dec. 26, 2012 (CN) .......................... 2012 1 0576022

(51) Int. Cl.
*G02F 1/1333* (2006.01)

(52) U.S. Cl.
CPC .............. *G02F 1/133308* (2013.01); *G02F 2001/133317* (2013.01); *G02F 2201/503* (2013.01)

(58) Field of Classification Search
CPC .......... G02F 1/133308; G02F 1/13452; G02F 1/133615; G02F 1/133608; G02F 1/133603; G02F 1/1333; G02F 1/13305; G02F 1/13454; G02F 1/133524; G02F 1/133504; G02F 1/133605; G02F 2001/133314; G02F 2001/133317; G02F 2001/13332; G02F 2201/503; G02F 2201/46; G02B 6/0088; G02B 6/0093; G02B 6/0073; G02B 6/0086; H05K 5/0217; H05K 2201/10136; H05K 2201/2009; H05K 2201/10681; H05K 3/361; H05K 1/0281; H05K 1/189; H05K 1/118; H05K 1/141; H05K 1/148; G06F 3/038
USPC ........... 349/58, 150, 65, 60, 62, 151, 67, 158; 345/87, 102, 204; 362/633, 561, 97.2, 362/246, 382, 581, 600, 632, 634; 361/749, 361/752, 829
See application file for complete search history.

(56) References Cited

U.S. PATENT DOCUMENTS 6,952,250 B2 * 10/2005 Ueda ............................. 349/150
7,940,364 B2 * 5/2011 Sugawara ..................... 349/150

(Continued)

FOREIGN PATENT DOCUMENTS

| CN | 1303021 A | 7/2001 |
|---|---|---|
| CN | 1737656 A | 2/2006 |
| CN | 101118327 A | 2/2008 |
| JP | 2006215438 A | 8/2006 |
| JP | 2007226068 A | 9/2007 |

*Primary Examiner* — Thoi Duong
(74) *Attorney, Agent, or Firm* — Mark M. Friedman

(57) ABSTRACT

A narrow bezel LCD module, comprising: a liquid crystal panel; a backlight module having at least one plastic frame to carry the liquid crystal panel; a front frame surrounding the plastic frame to fix the liquid crystal panel and form an accommodating space formed between the front frame and the plastic frame; at least one flexible package component disposed in the accommodating space and having a flexible circuit board which electrically connects to the liquid crystal panel and a driver circuit board; and at least one guide block disposed in the accommodating space, fixed on one inner side of the front frame and having a guide slope facing the flexible circuit board. The invention can avoid the flexible package component from being curved upward and damaged.

13 Claims, 3 Drawing Sheets

(56) References Cited

U.S. PATENT DOCUMENTS

| | | |
|---|---|---|
| 2001/0002145 A1 | 5/2001 | Lee et al. |
| 2006/0040520 A1 | 2/2006 | Moh |
| 2008/0024714 A1 | 1/2008 | Park |
| 2011/0255850 A1* | 10/2011 | Dinh et al. .................... 396/176 |
| 2013/0063899 A1* | 3/2013 | Kuroda ......................... 361/718 |

* cited by examiner

NARROW BEZEL LIQUID CRYSTAL DISPLAY MODULE

FIELD OF THE INVENTION

The present invention relates to a liquid crystal display module, and more particularly to a narrow bezel liquid crystal (LCD) module.

BACKGROUND OF THE INVENTION

Recently, in order to satisfy various requirements of high-density packaging in semiconductor package industries, various different package designs are gradually developed, wherein various design concepts of different package structures is mostly used to compact high-density package products, which thus can be suitable for being applied to thinner and smaller electronic products, such as narrow bezel liquid crystal display (LCD) device.

There is a trend to provide a narrow bezel design to a LCD module having a light-emitting diode (LED) backlight module. In the conventional products, the thickness of the bezel of modules is smaller than 5 mm, and there is still a requirement to design for further narrowing the bezel, especially in the design of large size and high-resolution module. To apply the narrow bezel design in the LCD module having the LED backlight module and develop toward the trend of compacting electronic products, and enhancing the function and speed thereof, there thus is a trend to develop the techniques of reducing the thickness and area of driver chip packages, such as a chip-on-film (COF) flexible package component. The COF flexible package component is used to mount a driver chip (i.e. a gate chip) on a surface of a flexible circuit board, and one end of the flexible circuit board electrically connects to one surface of a glass substrate through metal bumps, and the other end of the flexible circuit board electrically connects to one driver circuit board, respectively.

However, in the LCD module using the LED backlight module, when the LCD module is assembled, a space between the plastic frame and the front frame is used to accommodate the COF flexible package component and the driver circuit board. Therefore, if the space between the plastic frame and the front frame is reduced and the flexible circuit board of the flexible package component is easy to be curved upward, it is easy to cause the problems of the flexible circuit board curved upward and damaged during assembly, so as to reduce the assembly yield of the narrow bezel LCD module.

As a result, it is necessary to provide a narrow bezel liquid crystal display (LCD) module to solve the problems existing in the conventional technologies, as described above.

SUMMARY OF THE INVENTION

According to that, the present invention provides a narrow bezel liquid crystal display (LCD) module to solve the problems existing in the conventional technologies, wherein the trend of narrowing bezel design is easy to cause a flexible circuit board of a chip-on-film (COF) flexible package component to be curved upward and damaged.

A primary object of the present invention is to provide a narrow bezel LCD module, which can efficiently avoid a flexible circuit board of a COF flexible package component from being curved upward and damaged under the design trend of narrowing bezel, so as to increase the assembly yield of the narrow bezel LCD module.

To achieve the above object, one embodiment of the present invention provides a narrow bezel liquid crystal display (LCD) module which comprises:

a liquid crystal panel having an upper glass substrate and a lower glass substrate;

a backlight module having at least one optic film, a back plate and at least one plastic frame, wherein the back plate carries the optic film and the plastic frame surrounds the back plate to carry the liquid crystal panel;

a front frame surrounding the plastic frame to fix the liquid crystal panel, and an accommodating space formed between the front frame and the plastic frame;

at least one chip-on-film (COF) flexible package component disposed in the accommodating space and having at least one chip and a flexible circuit board, wherein the chip is fixed on one surface of the flexible circuit board facing the plastic frame, one end of the flexible circuit board electrically connects to the lower glass substrate and the other end of the flexible circuit board electrically connects to a driver circuit board; and at least one guide block, which is a conductive foam block, wherein the guide block is disposed in the accommodating space and fixed on one inner side of the front frame and tightly adhered to the inner side of the front frame by a double-sided adhesive tape, and the guide block has a guide slope facing the flexible circuit board.

In one embodiment of the present invention, the guide slope of the guide block and the flexible circuit board has a gap formed therebetween.

In one embodiment of the present invention, the guide slope of the guide block is in contact with the flexible circuit board.

In one embodiment of the present invention, the guide block, which is a strip having triangular or trapezoidal cross-section, is adhered to the inner side of a corner position of the front frame.

Furthermore, another embodiment of the present invention provides a narrow bezel liquid crystal display (LCD) module which comprises:

a liquid crystal panel having an upper glass substrate and a lower glass substrate;

a backlight module having at least one optic film, a back plate and at least one plastic frame, wherein the back plate carries the optic film and the plastic frame surrounds the back plate to carry the liquid crystal panel;

a front frame surrounding the plastic frame to fix the liquid crystal panel, and an accommodating space formed between the front frame and the plastic frame;

at least one chip-on-film (COF) flexible package component disposed in the accommodating space and having at least one chip and a flexible circuit board, wherein the chip is fixed on one surface of the flexible circuit board facing the plastic frame, and one end of the flexible circuit board electrically connects to the lower glass substrate and the other end of the flexible circuit board electrically connects to a driver circuit board; and at least one guide block disposed in the accommodating space and fixed on one inner side of the front frame, wherein the guide block has a guide slope facing the flexible circuit board.

In one embodiment of the present invention, the guide block is a foam block.

In one embodiment of the present invention, the guide block is a conductive foam block.

In one embodiment of the present invention, the guide block is a silicone block.

In one embodiment of the present invention, the hardness of the silicone block is less than 30 degrees.

In one embodiment of the present invention, the guide slope of the guide block and the flexible circuit board has a gap therebetween.

In one embodiment of the present invention, the guide slope of the guide block is in contact with the flexible circuit board.

In one embodiment of the present invention, the guide block is tightly adhered to the inner side of the front frame by a double-sided adhesive tape.

In one embodiment of the present invention, the guide block, which is a strip having triangular or trapezoidal section, is adhered to the inner side of a corner position of the front frame.

Furthermore, a further another embodiment of the present invention provides a narrow bezel liquid crystal display (LCD) module which comprises:

a liquid crystal panel having an upper glass substrate and a lower glass substrate;

a backlight module having at least one plastic frame to carry the liquid crystal panel;

a front frame surrounding the plastic frame to fix the liquid crystal panel, and an accommodating space formed between the front frame and the plastic frame;

at least one flexible package component disposed in the accommodating space and having a flexible circuit board, wherein one end of the flexible circuit board electrically connects to the lower glass substrate and the other end of the flexible circuit board electrically connects to a driver circuit board; and at least one guide block disposed in the accommodating space and fixed on one inner side of the front frame, wherein the guide block has a guide slope facing the flexible circuit board.

In one embodiment of the present invention, the flexible package component is a chip-on-film (COF) flexible package component or a chip-on-glass (COG) flexible package component.

To compared with the conventional technique, the narrow bezel LCD module of the present invention has at least one guide block which is disposed in the accommodating space and fixed on one inner side of the front frame, and the guide block has a guide slope facing the flexible circuit board, so as to solve the problem of a chip-on-film (COF) flexible package component to be curved upward and damaged, so that it can relatively increase the assembly yield of the narrow bezel LCD module during assembly.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
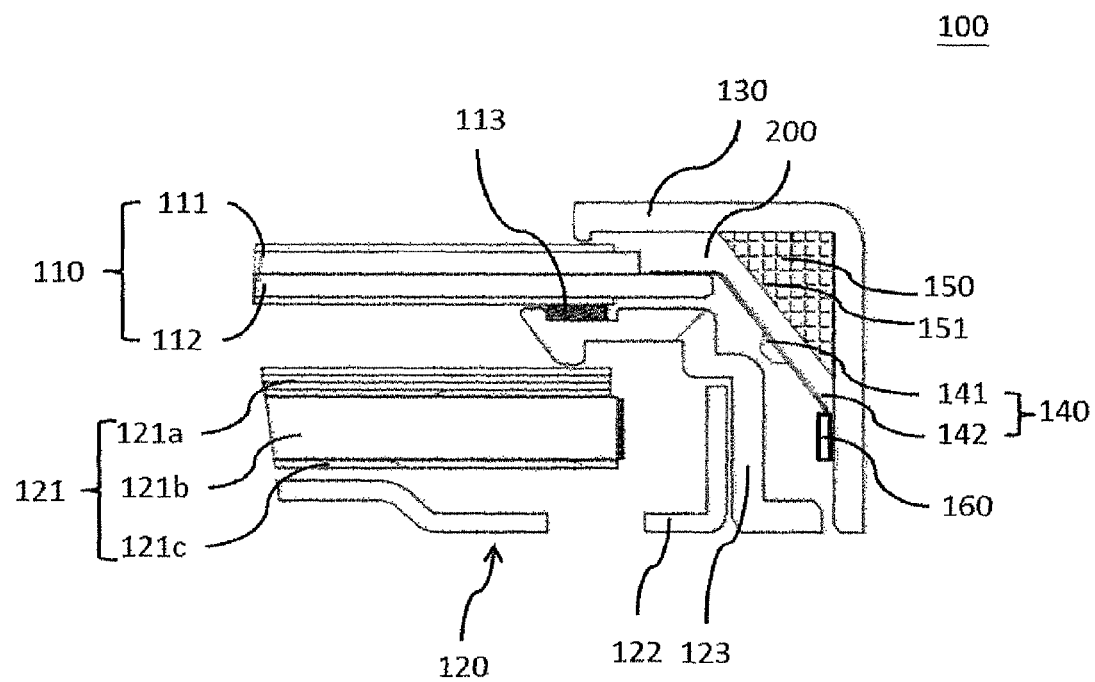
FIG. 1 is an assembled cross-sectional view of a narrow bezel LCD module according to a first embodiment of the present invention.

Referring to FIG. 1, a narrow bezel liquid crystal display (LCD) module according to a first embodiment of the present invention is illustrated. As shown, the narrow bezel liquid crystal display (LCD) module comprises: a liquid crystal panel 110, a backlight module 120, a front frame 130, at least one chip on film (COF) flexible package component and at least one guide block 150. The detailed structure, assembled relation and active function of each of the foregoing components will be described according to the first embodiment of the present invention by referring to the following detailed description and the accompanying FIGS. 1 to 2.

Referring again to FIG. 1, in the narrow bezel LCD module 100 according to the first embodiment of the present invention, the liquid crystal panel 110 comprises: an upper glass substrate 111 and a lower glass substrate 112, wherein the upper glass substrate 111 and the lower glass substrate 112 has a liquid crystal layer therebetween, and a transparent surface circuit (not shown) of an upper surface of the lower glass substrate 112 has a connection portion for electrical connection. In the embodiment of the present invention, the connection portion also can be disposed on a lower surface or an end surface of the lower glass substrate 112, but not limited thereto. The backlight module 120 comprises at least one optic film 121, a back plate 122 and at least one plastic frame 123, wherein the optic film 121 is disposed under the lower glass substrate 112, and the back plate 121 carries the optic film 121. In the embodiment of the present invention, the optic film 121 can comprise at least one optic thin film 121a, a light guide plate 121b and a reflector 121c, but not limited thereto, wherein the optic thin film 121a is disposed in front of the light guide plate 121b, and the reflector 121c is disposed in back of the light guide 121b. The back plate 122 is generally made by metal plate stamping and has a bottom plate and a plurality of lateral plates. A backlight source is disposed between the bottom plate of the back plate 122 and the lower surface of the optic firm 121 (or between the lateral plate of the back plate 122 and the lateral surface of the optic film 121), such as a circuit board having a plurality of light-emitting diodes (LED) (i.e. light bar).

Next, in the narrow bezel LCD module 100 according to the first embodiment of the present invention, the plastic frame 123 is generally made of plastic material or mixing material of plastic material and metal plate. The plastic frame 123 has a body portion and a shoulder, which the body portion of the plastic frame 123 is a vertical plate and that surrounds the back plate 122. The shoulder of the plastic frame 123 is horizontally extended inward from the body portion to carry the liquid crystal panel 110. It is worth mentioned that, in the embodiment of the present invention, the bottom surface of the lower glass substrate 112 is provided with a cushion pad 113, such as a foam sponge, which is disposed between the lower glass substrate 112 and the shoulder of the plastic frame 123 to provide shock-absorbing function. Additionally, the front frame 130 is generally made by metal plate stamping and surrounds the plastic frame 123 to fix the liquid crystal panel 110, wherein the front frame 130 and the plastic frame 123 has an accommodating space 200 therebetween. In the embodiment of the invention, the chip-on-film (COF) flexible package component 140 is disposed in the accommodating space 200, and has at least one chip 141 and a flexible circuit board 142. The chip 141, such as a gate driver chip, is fixed on the flexible circuit board 142 facing one surface of the plastic frame 123. And, one end of the flexible circuit board 142 electrically connects on the connecting portion of the top surface, bottom surface or end surface of the lower glass substrate 112 through metal bumps by thermo-compression technique, and the other end of the flexible circuit board 142 electrically connects to one driver circuit board 160. The driver circuit board 160 can control the chip 141, so that the chip 141 controls the switch of thin-film transistor array (TFT array) circuit of the lower glass substrate 112 through the flexible circuit board 142.

Furthermore, in the narrow bezel LCD module 100 of the first embodiment of the present invention, the narrow bezel LCD module 100 has at least one guide block 150, which is disposed in the accommodating space 200 and fixed on one inner surface of the front frame 130. In the embodiment of the present invention, the guide block 150 has a guide slope 151 facing the flexible circuit board 142, and the guide block 150 is a foam block having shock-absorbing function, wherein the foam block is preferably a conductive foam block. In another embodiment of the present invention, the guide block 150 also can be a silicone block, wherein the hardness of the silicone block is less than 30 degrees or the guide block 150 also can be other block materials having shock-absorption function. It is worth to mention that, the guide slope 151 of the guide block 150 and the flexible circuit board 142 has a gap therebetween. That is, the guide slope 151 of the guide block 150 is not in contact with the flexible circuit board 142.

Figure 2:
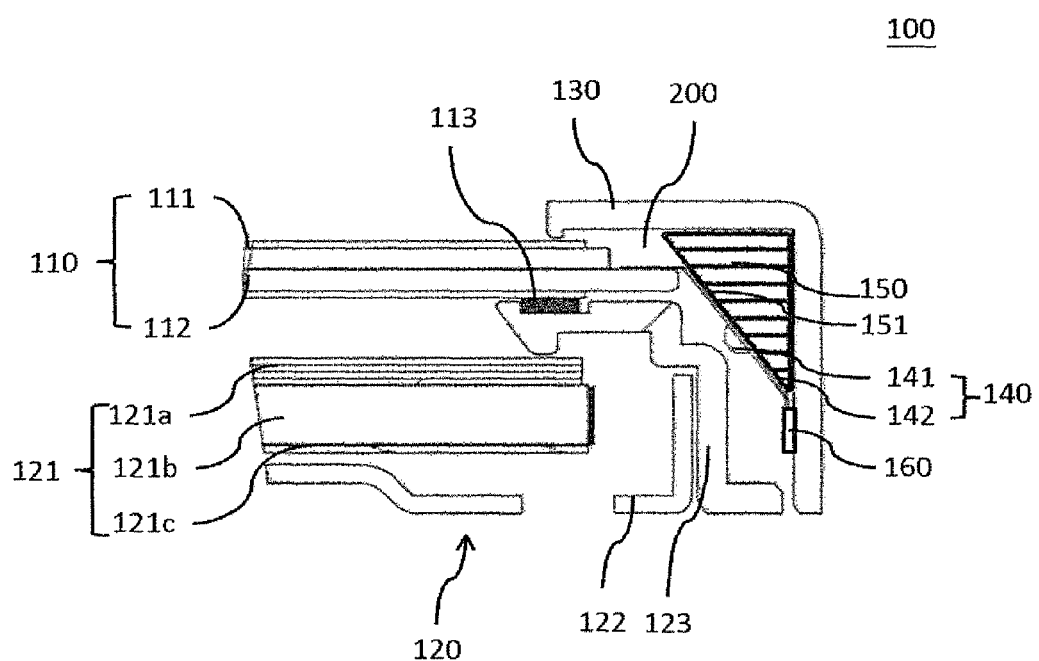
FIG. 2 is an assembled cross-sectional view of a narrow bezel LCD module according to a second embodiment of the present invention.

Moreover, the guide block 150 is tightly adhered to the inner side of the front frame 130 by a double-sided adhesive tape. Referring to FIGS. 1 and 2, the guide block 150 is, a strip having triangular cross-section, adhered to two inner sides of a corner position of the front frame 130. The advantage of the foregoing feature is that: during the front frame 130 is assembled onto the backlight module 120, the guide slope 151 of the guide block 150 provides a blocking function to effectively avoid the problem of the flexible circuit board 142 of the flexible package component 140 which may be curved upward and damaged if the flexible circuit board 142 is deformed, so as to successfully cause the bottom end of the flexible circuit board 142 (and the driver circuit board 160) facing downward to locate on a predetermined assembly position. Therefore, the present invention can relatively increase the assembly yield of the narrow bezel LCD module.

Additionally, referring to FIG. 2, a package structure according to a second embodiment of the present invention is illustrated and similar to the first embodiment of the present invention, so that the second embodiment uses similar terms or numerals of the first embodiment. As shown, the difference of the second embodiment is that, in the narrow bezel LCD module 110 according to the second embodiment of the present invention, the guide slope 151 of the guide block 150 also can loosely fit or tightly fit to be in contact with an outer surface of the flexible circuit board 142, so as to also effectively avoid the problem of the flexible circuit board of the flexible package component 140 curved upward and damaged to relatively increase the assembly yield of the narrow bezel LCD module.

Figure 3:
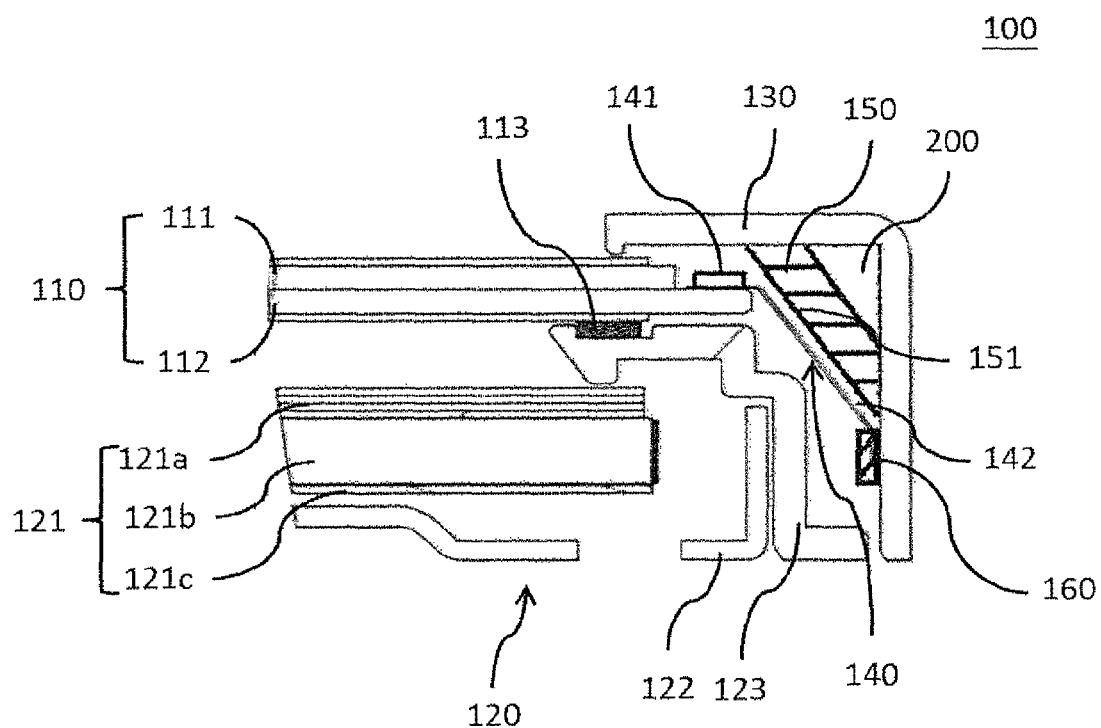
FIG. 3 is an assembled cross-sectional view of a narrow bezel LCD module according to a third embodiment of the present invention.

Referring to FIG. 3, a package structure according to a third embodiment of the present invention is illustrated and similar to the first embodiment of the present invention, so that the third embodiment uses similar terms or numerals of the first embodiment. As shown, the difference of the third embodiment is that, in the narrow bezel LCD module 100 according to the third embodiment of the present invention, the guide block 150, which is a strip having trapezoidal cross-section, is adhered to two inner sides of a corner position of the front frame 130. Furthermore, the chip-of-film (COF) flexible package component also can be replaced by a chip-on-glass (COG) flexible package component, wherein the chip 141 is directly disposed on the transparent surface circuit board of the top or bottom surface of the lower glass substrate 112. At this time, the flexible circuit board 142 does not have the chip, and is only simply electrically connect between the lower glass substrate 112 and the driver circuit board 160. In the embodiment, the guide slope 151 of the guide block 150 can effectively avoid the problem of the flexible circuit board 142 of the flexible package component 140 curved upward and damaged, so as to relatively increase the assembly yield of the narrow bezel LCD module.

As described above, in comparison with the aging and partial curved problems of the chip-on-film (COF) flexible package component according to the conventional narrow bezel liquid crystal display (LCD) module which easily generates the disadvantages of the chip-on-film (COF) flexible package component curved upward and damaged the liquid crystal panel, the narrow bezel LCD module of the present invention after installing with the guide block can provide a blocking effect to further limit the space where the chip flexible package component or the flexible circuit board (FCB) exists, so as to achieve the design of narrow bezel.

The present invention has been described with a preferred embodiment thereof and it is understood that many changes and modifications to the described embodiment can be carried out without departing from the scope and the spirit of the invention that is intended to be limited only by the appended claims.

What is claimed is:
1. A narrow bezel liquid crystal display (LCD) module, comprising:
  a liquid crystal panel having an upper glass substrate and a lower glass substrate;
  a backlight module having at least one optic film, a back plate and at least one plastic frame, wherein the back plate carries the optic film and the plastic frame surrounds the back plate to carry the liquid crystal panel;
  a front frame surrounding the plastic frame to fix the liquid crystal panel, and an accommodating space formed between the front frame and the plastic frame;
  at least one chip-on-film (COF) flexible package component disposed in the accommodating space and having at least one chip and a flexible circuit board, wherein the chip is fixed on one surface of the flexible circuit board facing the plastic frame, one end of the flexible circuit board electrically connects to the lower glass substrate and the other end of the flexible circuit board electrically connects to a driver circuit board; and
  at least one guide block, which is a conductive foam block, wherein the guide block is disposed in the accommodating space and fixed on one inner side of the front frame and tightly adhered to the inner side of the front frame by a double-sided adhesive tape, and the guide block has a guide slope facing the flexible circuit board;

wherein the guide block, which is a strip having triangular or trapezoidal cross-section, is adhered to the inner side of a corner position of the front frame and extends over a corner of the front frame.

2. The narrow bezel LCD module according to claim 1, wherein the guide slope of the guide block and the flexible circuit board has a gap formed therebetween.

3. The narrow bezel LCD module according to claim 1, wherein the guide slope of the guide block is in contact with the flexible circuit board.

4. A narrow bezel liquid crystal display (LCD) module, comprising:
   a liquid crystal panel having an upper glass substrate and a lower glass substrate;
   a backlight module having at least one optic film, a back plate and at least one plastic frame, wherein the back plate carries the optic film and the plastic frame surrounds the back plate to carry the liquid crystal panel;
   a front frame surrounding the plastic frame to fix the liquid crystal panel, and an accommodating space formed between the front frame and the plastic frame;
   at least one flexible package component disposed in the accommodating space and having at least one chip and a flexible circuit board, wherein the chip is fixed on one surface of the flexible circuit board facing the plastic frame, and one end of the flexible circuit board electrically connects to the lower glass substrate and the other end of the flexible circuit board electrically connects to a driver circuit board; and
   at least one guide block disposed in the accommodating space and fixed on one inner side of the front frame, wherein the guide block has a guide slope facing the flexible circuit board;

wherein the guide block is adhered to the inner side of a corner position of the front frame and extends over a corner of the front frame.

5. The narrow bezel LCD module according to claim 4, wherein the guide block is a foam block.

6. The narrow bezel LCD module according to claim 5, wherein the guide block is a conductive foam block.

7. The narrow bezel LCD module according to claim 4, wherein the guide block is a silicone block.

8. The narrow bezel LCD module according to claim 7, wherein the hardness of the silicone block is less than 30 degrees.

9. The narrow bezel LCD module according to claim 4, wherein the guide slope of the guide block and the flexible circuit board has a gap therebetween.

10. The narrow bezel LCD module according to claim 4, wherein the guide slope of the guide block is in contact with the flexible circuit board.

11. The narrow bezel LCD module according to claim 4, wherein the guide block is tightly adhered to the inner side of the front frame by a double-sided adhesive tape.

12. The narrow bezel LCD module according to claim 4, wherein the guide block is a strip having triangular or trapezoidal section.

13. The narrow bezel LCD module according to claim 4, wherein the flexible package component is a chip-on-film (COF) flexible package component or a chip-on-glass (COG) flexible package component.

* * * * *